UNITED STATES PATENT OFFICE.

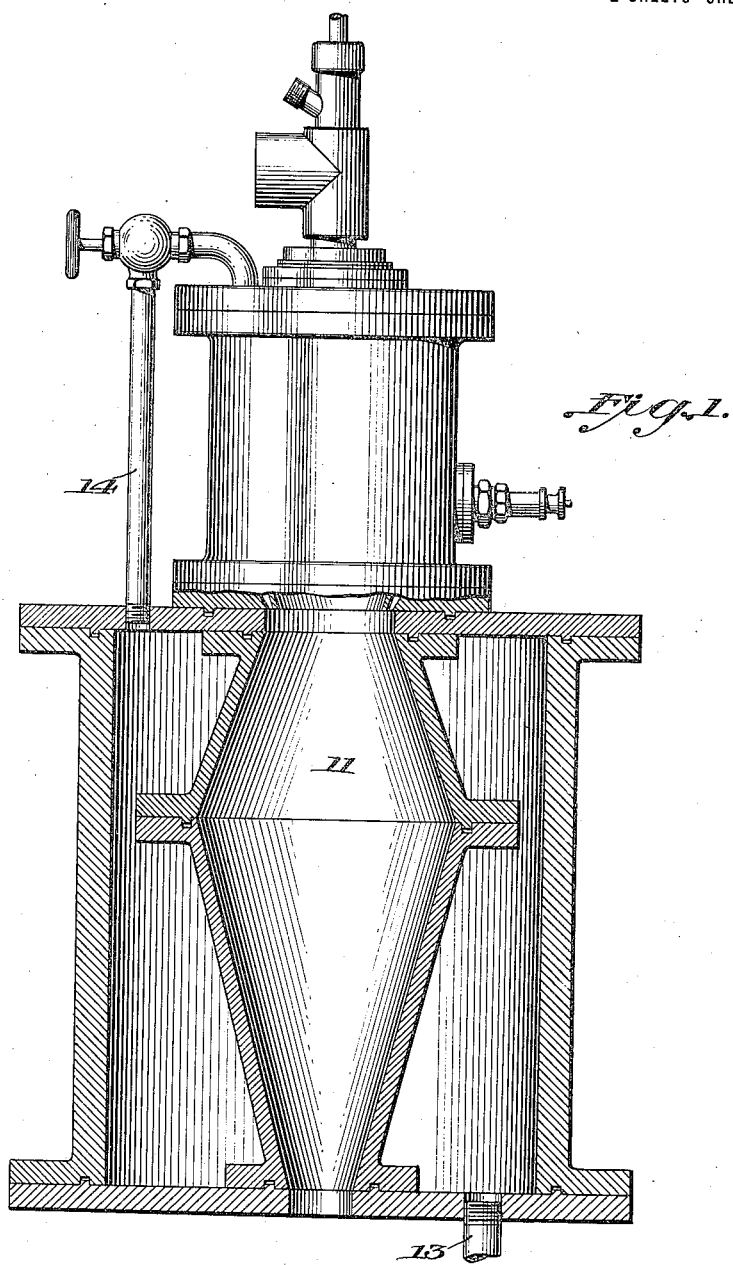

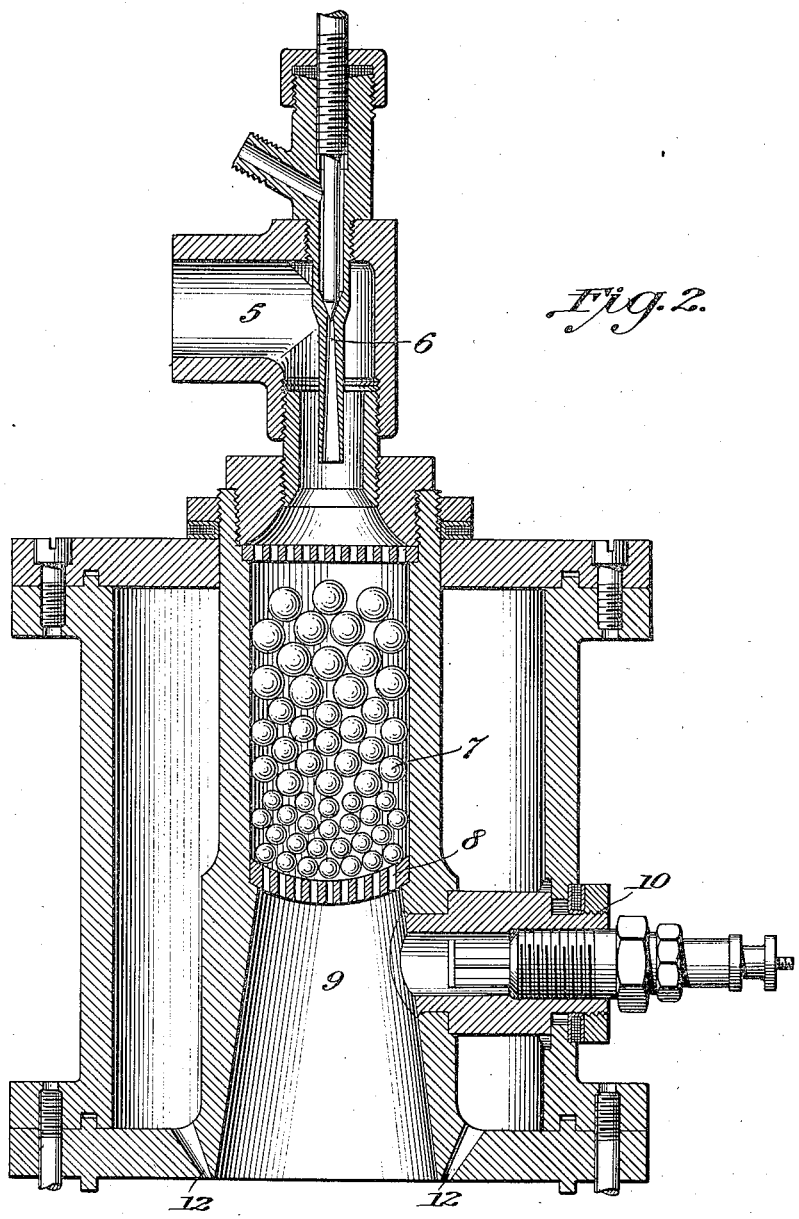

WILLIAM A. WARMAN, OF NEW YORK, N. Y., ASSIGNOR TO KELLER MECHANICAL ENGRAVING COMPANY, OF BROOKLYN, NEW YORK, A CORPORATION OF NEW YORK.

POWER-GENERATOR.

1,183,785. Specification of Letters Patent. Patented May 16, 1916.

Application filed February 11, 1914. Serial No. 817,995.

*To all whom it may concern:*

Be it known that I, WILLIAM A. WARMAN, a citizen of the United States, and a resident of New York, borough of Manhattan, in the county of New York and State of New York, have made and invented certain new and useful Improvements in Power-Generators, of which the following is a specification.

My invention relates to the art of generating a motive fluid under pressure, and composed of a mixture of products of combustion and steam, such motive fluid being available for the purpose of operating an engine of the turbine, reciprocating or other type, and for other purposes.

Heretofore, in the generation of a motive fluid composed of products of combustion and steam under pressure, it has been the usual practice to supply air and fuel separately and continuously to a combustion chamber to be subsequently mixed therein and burned; after which a mixture of air and water, or water alone, is supplied under pressure to the burning mixture and converted into steam by heat derived therefrom. The result of this procedure is that an excess of air is always present in the resulting motive fluid, as where air and fuel are separately supplied to the combustion chamber, the air is invariably supplied in excess of the exact quantity necessary for complete and perfect combustion, in order to render it certain that a sufficient supply of oxygen will be present in the combustion chamber, after the air and fuel have been properly mixed, to insure the combustion of the carbon present. Where water only has been supplied to the mixture as it burns, there has been an excess of air in the resulting motive fluid, and if air be supplied with the water, as is the case when the water is sprayed into the combustion chamber, the excess of air in the resulting mixture is obviously still greater.

In carrying out the method or process wherein my invention consists, the end to be attained is a motive fluid under pressure, in which the excess of air is reduced to a minimum, and, so far as possible, entirely avoided, the resulting fluid thus containing a larger proportion of water in the form of steam, either dry, saturated, or super-heated, than has been present in the motive fluid produced by prior devices or in the performance of prior processes.

My invention further contemplates the elimination of all methods and means wherein the heat caused by the burning mixture is to be transmitted to and through metal plates or devices by conduction and convection for the generation of steam, as, for instance, those devices and methods wherein the combustion chamber contains a coil of pipe for conveying water therein to be converted into steam and subsequently mixed with the burning gases. It has been demonstrated that such methods are fatal to the economical operation and efficiency of the generator. In such instances, the heat, to be imparted by the burning gases to the water to be converted into steam, and contained within the coiled pipe located in the combustion chamber, must follow a path through the gas film itself, through the surface contact between the plate and the gas, through the metallic pipe or plate, the surface of contact between the pipe and the contained water, the water film clinging to the interior surface of the pipe, to the mass of water within the pipe. Furthermore, it generally happens that the pipe is dirty both on its exterior and interior surfaces, so that there must be added to the above, a layer of sooty material or deposit on the outer side of the pipe, and a layer of scale on the water side. In contradistinction to methods wherein the transmission of the heat by conduction and convection by such a path is employed, my present improved method involves the injection of water in the form of a spray, or small particles, directly into the combustion chamber and directly into the burning gases, resulting in the utilization of all the heat of the fuel and permitting the spray or particles of water to expand in a medium which is much less dense than the water itself; that is, it permits the water to be directly converted into steam in the burning gases contained within the combustion chamber, and which gases, of course, are less dense than the water contained, for instance, in a boiler or coil of pipe. This conversion of the small particles of water into steam in a medium of heated gases takes place much more rapidly, and with a greater expansion, and at an expenditure of much less heat than where the water is converted into steam by transmission of heat by conduction and convection.

In order to permit of the employment of the ordinary materials of construction, and without danger of injury thereto from the heat generated by the burning gases, and in order to permit of the generator being constructed of a small and compact size, I have found it essential, and my improved method therefore contemplates, to supply the fuel to the combustion chamber at a constantly increasing velocity as it approaches its point of egress from the nozzle or inlet pipe into the combustion chamber, the rate being greater than that of the propagation of the flame. This step in the method insures a "blow-off" at the inlet, and sufficient to prevent the fuel from being burned directly in contact with the nozzle, and the injurious heating or burning thereof; and also prevents any back firing in the mixer or supply pipe to the detriment thereof.

From investigation and numerous experiments, I have also discovered that in order to secure the greatest efficiency, and the most beneficial results from an economic standpoint, it is essential first, that the direction of flow of the motive fluid must be in a straight line, that is, without in any way being deflected from its natural path, or in anywise impeded in its flow. Furthermore, in order to permit of the use of the ordinary materials of construction, the burning gases in the combustion chamber must be sufficiently cooled before coming into contact therewith, and hence my improved method contemplates the injection of the spray of water directly into the flame, and at a point where the flame is propagated, or in close proximity thereto, thereby lowering the temperature of the burning gases to below the destructive point, and without any loss thereof.

The method therefore involves the following steps: First, continuously supplying air and fuel to the combustion chamber, mixed in such proportions as to form a combustible mixture, and without excess of either of said ingredients. Secondly, supplying said combustible mixture to the combustion chamber at a constantly increasing velocity, and at a rate greater than the propagation of the flame. Thirdly, causing said mixture to burn as it enters the combustion chamber. Fourthly, injecting water in small particles directly into the flame at or near the point of its propagation. Fifthly, permitting the fluid to flow in its natural path without impediment.

For the purpose of carrying out this method, the generator may be constructed in many and various ways, that which I have used and tested with remarkable results being shown in the accompanying drawings, wherein, Figure 1 is a view showing the apparatus referred to, partly in section and partly in elevation; Fig. 2 is a view showing a portion of the apparatus in section, and somewhat enlarged.

In the accompanying drawings, 5 is an air supply pipe or conduit, and 6 a conduit through which is supplied the fuel, the latter being commonly used in the form of a liquid hydrocarbon or gas. These conduits are each provided with suitable regulating valves, in order that the respective volumes of air and fuel supplied may be such as to render the resultant mixture combustible, and so that there will be no unused fuel, and no uncombined oxygen in the products of combustion after the mixture is burned. If desired, however, the proportions of the constituents or ingredients of the fuel may be otherwise determined or properly proportioned to produce, as near as possible, a like result.

The air and fuel are passed through the mixing chamber 7 wherein they are thoroughly and intimately mixed, as by means of a mass of balls or pieces of refractory material, preferably decreasing in size toward the outlet or point of egress, whereby to gradually decrease or restrict the passage-way for the mixture, and thereby gradually increase its velocity of flow on the way to the combustion chamber. The mixture then passes from the chamber 7, through the perforated plate or diaphragm 8, and into the chamber 9, wherein it is ignited, as by means of a spark plug located in the opening 10.

The rate at which the air and fuel are supplied to the mixing chamber, and the rate at which the mixture issues therefrom into the igniting chamber, should be greater than that of the propagation of the flame, in order that the zone in which the ignition of the mixture occurs shall be located at an appreciable distance from the diaphragm or plate 8, to avoid the burning and destruction thereof. Furthermore this rapid and gradually increasing flow of the combustible mixture into, through and out of the mixing chamber will effectually prevent any back firing, which would otherwise be liable to occur.

In close proximity to the point or place of the propagation of the flame, that is, at the place where the burning gas issues from the ignition chamber into the enlarged mixing or equalizing chamber 11, there is injected into the flame or burning gases, a spray of water, through the series of passages or nozzles 12, preferably so arranged as to discharge the fine particles of water into the burning gas in the same direction in which the latter is flowing, the water being rapidly converted into steam and forming a component part of the resultant fluid, at the same time cooling the burning gases to such a temperature as will prevent the destruction of the metal or other material of which the chamber 11 is constructed, the resultant fluid, comprising the burned gases and steam, being allowed to flow in its natural path. By such method I entirely avoid the use of baffle plates, ordinarily constructed of highly refractory material and utilized for assisting in breaking up and intimately mixing the air and fuel, subsequent to their passage into the combustion chamber, to render the mixture combustible, and which baffle plates necessarily divert and impede the direction and flow of the fluid, and to that extent decrease the efficiency of the generator. From the chamber 11 the fluid under pressure is led through a suitable outlet pipe to an engine or other transformer.

From the foregoing, it will be understood that by injecting a spray of water into the flame at or about the time that the latter is propagated, the temperature of the burning gases is not only lowered to a desirable degree, but it permits of the rapid conversion of the water into steam, the expansion thereof taking place in a medium of gases necessarily of much less density than in those instances where the water is converted into steam in a boiler or coil of pipe located within the combustion chamber by the heat transmitted from the combustion chamber through the pipes to the medium of water contained within the latter.

It will be further understood that by the practice of my improved method hereinabove described, there is no inert matter supplied to or contained within the combustion chamber, only just such an amount of air being supplied as will render the fuel combustible, and just so much water in liquid form, supplied to the burning gases or flame as it is propagated, as is necessary to cool the fluid to its proper temperature, and as will absorb the necessary amount of heat to convert the water into steam, either in a superheated condition, dry or saturated, as may be desired, thereby avoiding the loss of compression in the combustion chamber incident to those methods wherein the excess of inert air is supplied to the combustion chamber, either alone or with the water injected into the flame.

It will also be understood that the working fluid resulting from my process partakes more of the characteristics of steam than of a permanent gas, and therefore a far more effective one for purposes than such as contains a large proportion of gas.

The detailed arrangement of the apparatus for supplying water to the burning mixture, as before described, is unimportant so far as the same relates to the method herein claimed. In the apparatus which I have heretofore used, I have provided a water jacket about the chamber 11, to which the water is supplied through a pipe 13, and around the mixing chamber 7, and ignition chamber 9, to which the water is supplied through the pipe 14, a regulating valve being preferably provided in the latter, the several parts being therefore cooled and protected from injury by their high temperature contained within the ignition chamber. This construction, however, may be varied as desired, it being essential, however, to the economic working of the apparatus, and the efficiency of the same, to prevent the water from being converted into steam prior to the injection of the same into the flame or burning gases.

I am well aware that it is not new to inject steam into the burning gases in a combustion chamber, nor to inject water, in its liquid form, into the burning gases, and hence I make no claim to such; but I am not aware of any process wherein a working fluid has been generated by continuously supplying air and fuel to a combustion chamber, thoroughly and intimately mixed prior to the entrance thereof into the chamber, and without excess of either of the elements or ingredients; causing the mixture to burn as it enters the combustion chamber, and to continuously inject into the burning mixture water in its liquid form at or about the time and place of the propagation of the flame, and Therefore, what I claim is:

1. The process of generating a fluid under pressure which consists in continuously supplying air and fuel in such proportions as to form a combustible mixture without excess of either, to a closed chamber, causing said combustible mixture to burn as it enters said chamber; and continuously injecting water in its liquid form into said burning mixture, the rate at which said mixture is supplied to the chamber being greater than that of the propagation of the flame.

2. The process of generating a fluid under pressure which consists in continuously supplying air and fuel in such proportions as to form a combustible mixture, without excess of either, to a closed combustion chamber; causing said combustible mixture to burn as it enters the combustion chamber, and continuously injecting water in liquid form into said burning mixture in substantially the same direction of flow of the latter.

3. The process of generating a fluid under pressure which consists in continuously supplying air and fuel in such proportions as to form a combustible mixture without excess of either, to a closed combustion chamber, and at a velocity greater than the rate of the propagation of the flame in said mixture, causing said combustible mixture to burn as it enters the combustion chamber, and continuously injecting water in liquid form into said burning mixture in substantially the same direction as the flow of the latter.

4. The method hereinbefore described of producing a working fluid under pressure, which consists in supplying air and fuel in such proportions as to form a combustible mixture without excess of either, to a mixing chamber, intimately mixing said air and fuel, and subsequently supplying said mixture to a closed combustion chamber, causing said mixture to burn in said chamber, and finally injecting water in its liquid form into the flame at about the time and place where the latter is propagated, the rate at which said mixture is supplied to the combustion chamber being greater than that of the propagation of the flame.

5. The method hereinbefore described of generating a fluid under pressure, which consists in continuously supplying air and fuel in just such proportions as will form a combustible mixture to a closed combustion chamber, and at a gradually increased rate of speed as it approaches said chamber, causing said mixture to burn in said chamber at an appreciable distance from the point of ingress into said chamber, and continuously injecting water into the burning gases at about the place of the propagation of the flame.

Signed at New York, borough of Manhattan, in the county of New York and State of New York, this 6th day of February, A. D. 1914.

WILLIAM A. WARMAN.

Witnesses:
 ANNA V. WALSH,
 GEORGE E. COOK.